Figure 1:
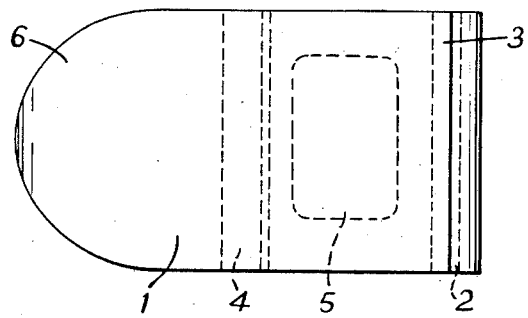

April 7, 1964     W. H. SEWARD     3,127,650
BUCKLES

Filed March 12, 1962     3 Sheets-Sheet 1

INVENTOR
WILLIAM HENRY SEWARD
BY
*Irwin S. Thompson*
ATTORNEY

April 7, 1964 W. H. SEWARD 3,127,650
BUCKLES
Filed March 12, 1962 3 Sheets-Sheet 2

INVENTOR
WILLIAM HENRY SEWARD
BY
*Irwin S. Thompson*
ATTORNEY

April 7, 1964  W. H. SEWARD  3,127,650
BUCKLES
Filed March 12, 1962  3 Sheets-Sheet 3
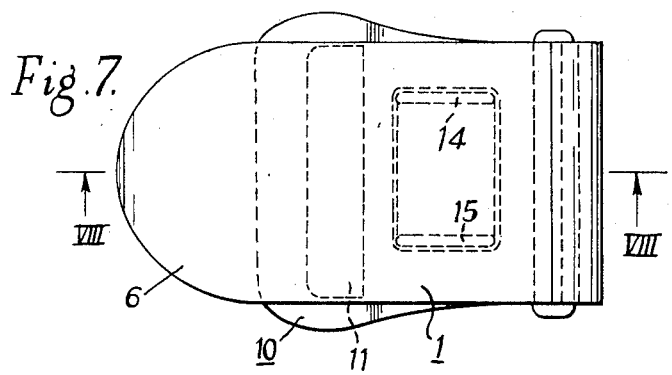
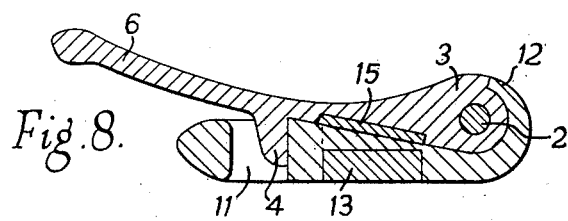
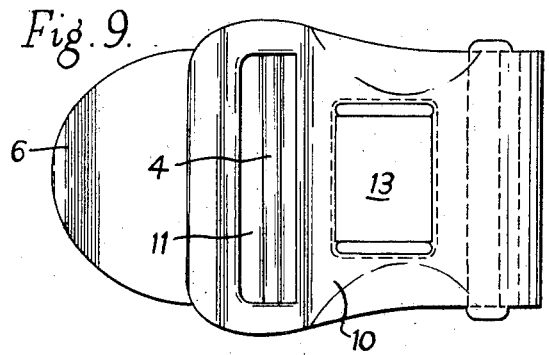
INVENTOR
WILLIAM HENRY SEWARD
BY
ATTORNEY

United States Patent Office 3,127,650
Patented Apr. 7, 1964

3,127,650
BUCKLES
William Henry Seward, Havant, England, assignor to Kangol Helmets Limited, London, England, a British company
Filed Mar. 12, 1962, Ser. No. 178,882
Claims priority, application Great Britain Mar. 13, 1961
2 Claims. (Cl. 24—68)

The present invention relates to buckles and is particularly concerned with buckles or fastenings suitable for use on safety seat assemblies for use in motor cars, aircraft seat belts and body harness of a similar type.

The primary requirements of such buckles are that they should be readily engageable in the correct position and only in this position, that they should not cause discomfort or damage to clothing during use, that they should not be disengageable accidentally but yet be readily disengageable under load, and that they should not be subject to appreciable wear or corrosion in use. A number of proposals have already been made for meeting these various requirements but none has hitherto been entirely satisfactory. The chief object of the present invention is to provide an improved form of buckle which shall be light in weight and cheap to manufacture and shall present the various advantages set out above.

According to the invention, in a quick release two-part buckle suitable for joining the ends of a safety seat belt or the like the co-operating parts are so shaped that during the opening and closing operation one part pivots about the other to give a toggle effect whereby tension on the belt will maintain the two parts more firmly in the closed position, the pivoting movement to open the buckle being resisted by magnetic attraction between a permanent magnet carried by one part and a co-operating member of magnetic material on the other part.

Conveniently the magnetic attraction effect is achieved by arranging that the permanent magnet on one part co-operates with a steel plate on the other part and polepieces are preferably associated with the permanent magnet in order to concentrate the flux. A possible alternative is to make use of a permanent magnet on each of the parts, preferably in the form of longitudinally magnetised bars, one at least of the magnets being arranged to be rotatable through 180° so that in the position in which attraction is desired, unlike poles of the two magnets are adjacent while when the parts of the buckle are to be separated, the movable magnet is rotated so that like poles are then adjacent and consequently a repulsion effect is produced which serves to facilitate the disengagement.

Preferably both parts are formed of aluminum alloy and are produced by pressure die casting.

Figure 2:
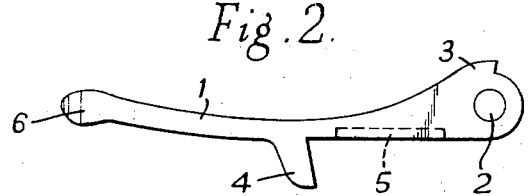
Figure 3:
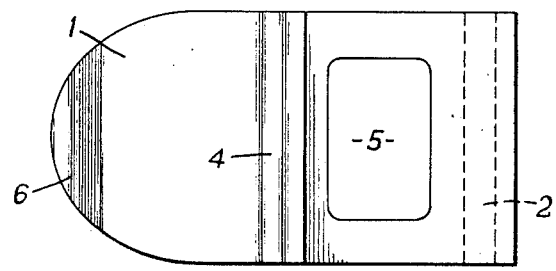
Figure 4:
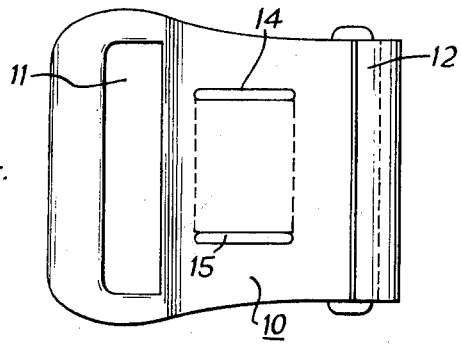
Figure 5:
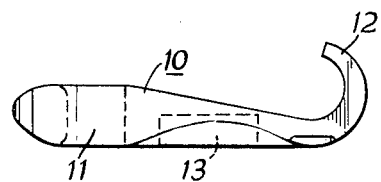
Figure 6:
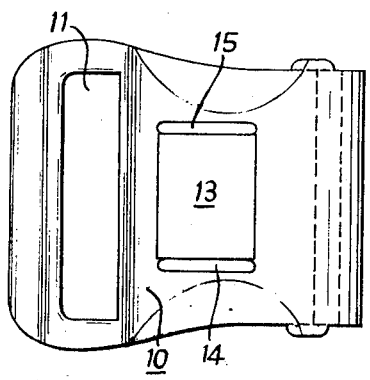

The invention will be better understood from the following description of one method of carrying it into effect which should be taken in conjunction with the accompanying drawings comprising FIGURES 1-9. Of these, FIGURES 1-3 represent respectively plan, elevation and inverted plan views of one portion of the buckle, FIGURES 4-6 represent similar views respectively of the other portion, while FIGURES 7-9 are corresponding views of the two portions when mated together, except that FIGURE 8 is a section along the line VIII—VIII in FIGURE 7.

Referring first to FIGURES 1-3, the outer portion of the buckle when it is used on a belt comprises a generally flat member 1 of the shape shown, which is preferably a die-casting of aluminum or aluminum alloy. This is somewhat thickened at the right-hand end as shown in FIGURES 1-3 and this part is provided with a transverse hole 2. This is designed to take a suitable pin by which this portion of the buckle is secured to a link which has two end members of approximately the same width as the belt and which incorporates a convenient arrangement for ready adjustment of the length of the belt. The link includes between the two end members a knurled roller supported on pivots which are movable in slots in the side members of the link. The belt is threaded round this roller and when tension is applied thereto, the pivots are moved towards one end of the slots so that the belt is gripped between the knurled portion and the end member of the link and is thus tightly held. If the tension is released, the roller is free to move towards the other end of the slots in which position it no longer grips the belt so that adjustment may be made in either direction.

The portion 1 is also shaped so as to have immediately above the hole a notched portion 3 with a plane face extending substantially radially from the hole. On the lower side, the portion 1 is provided with a transverse ridge or projection 4 with a substantially plane surface which makes a predetermined angle slightly less than 90° with the flat lower surface. Flush with this surface is embedded a substantially rectangular steel plate 5 which is located centrally. The left-hand end 6 of this portion of the buckle is thickened slightly and rounded to form a tongue or finger-grip by means of which the buckle may conveniently be opened or closed.

Considering now the complementary portion 10 shown in FIGURES 4-6, this also is a die casting of aluminium or aluminium alloy which will provide a requisite strength with the dimensions shown. This member 10 is provided at one end with a slot 11 through which an appropriate loop in the belt is passed and at its other end has a hooked portion 12 as shown most clearly in FIGURE 5. A permanent magnet 13 magnetised substantially at right-angles to the longitudinal direction of the belt is located in a depression in the underside of the member 10 and makes close contact at its ends with polepieces 14 and 15 which pass through the thickness of the member 10 so as to emerge substantially flush with the upper surface. The magnet and polepieces are a close fit in the cavity and holes provided to receive them and may be held firmly in position by epoxy resin.

In order to fasten the buckle, the notched portion 3 of the outer member 1 is moved into engagement with the end of the hook portion 12 of the inner member 10 and the finger grip is moved inwards towards the belt. Thereupon the ridge or projection 4 moves into the slot 11 and its plane surface comes into engagement with the side of the slot as best seen in FIGURE 8. At the same time, the ends of the polepieces 14 and 15 contact the plate 5 in the upper portion 1 so that the magnetic circuit is completed and a strong holding action is provided against accidental disengagement.

It will be appreciated that owing to the shaping and relative location of the parts, a toggle effect is produced or in other words during the mating operation the parts move just past a dead centre position so that a direct pull on the belt will tend to hold the buckle more firmly closed and accidental disengagement is prevented by the magnetic locking action. When it is required to separate the parts however this can be effected even under full load by an outward movement of the finger grip which pivots the notch 3 of the outer member about the end of the hook portion 12 so that a large mechanical advantage is obtained to overcome the magnetic attraction and the transverse component of the tension of the belt and the mating surfaces of the ridge 4 and the slot 11 are then disengaged.

It may be mentioned that in a form of the of the belt suitable for use on motor cars, two anchorage points are provided on the floor of the car behind each of the front seats and from the outer one of these the belt extends to the tongued portion of the buckle shown in FIGURES 1-3. It is asumed that two different parts of the belt will extend respectively over the lap of the wearer and diagonally across the shoulder, in each case terminating at the anchorage near the centre line of the car. These two parts are joined by a continuous length of belt which passes through the slot 11 on the inner member illustrated in FIGURES 4–6. The connections to the anchorage points may be reversed if desired. The fact that a magnet is used in one part of the buckle enables the belt to be tidily parked when the seat is vacated by causing the buckle to be attracted and held by a member of magnetic material located on the belt near the top of the seat.

It will be understood that for the use contemplated it is desirable that the buckle should not pull apart under a stress equal to the breaking stress of the belt itself. The belt is conveniently made of nylon webbing which has a useful degree of elasticity. Moreover, it is essential that the buckle should be readily disengageable even under full load, for instance if the vehicle has been overturned so that the full weight of the wearer is being taken by the belt. These requirements are met by the arrangement according to the invention and it is found that the buckle will not be destroyed or damaged by any load up to the full design value and also owing to the large mechanical advantage which is provided by the pivoting operation of the tongued member, a comparatively small force is required to open the buckle even under full load. This quick release feature obviates any additional hazard to the wearer if immediate disengagement is necessary in an emergency, for instance owing to a fire risk.

The present invention accordingly provides a simple and efficient fastening device for a belt or the like which is eminently suitable for meeting the requirements for safety belts on road vehicles.

I claim:

1. A quick-release two-part buckle suitable for joining the ends of a safety seat belt, comprising a first member, an extended portion at one end of said first member forming a finger grip, a pin located in a hole at the other end of said first member and serving for attachment of said first member to one end of the belt, a shoulder on the outer side of said first member on a portion otherwise substantially concentric with said pin, a second member curved outwardly at one end to form a hooked portion generally concentric with said pin in said first member when said first and second members are mated whereupon said shoulder on said first member engages the end of said hooked portion of said second member, there being a slot at the other end of said second member serving for attachment thereof to the other end of the belt, one of said members comprising a permanent magnet and the other of said members comprising a member of magnetic material which co-operates with said permanent magnet to prevent inadvertent disengagement of said first and second members by pivoting of said first members about the axis formed by the engagement of said shoulder on said first member with the end of said hooked portion of said second member.

2. A quick-release two-part buckle suitable for joining the ends of a safety seat belt, comprising a first member, an extended portion at one end of said first member forming a finger grip, a pin located in a hole at the other end of said first member and serving for attachment of said first member to one end of the belt, a shoulder on the outer side of said first member on a portion otherwise substantially concentric with said pin, a projection extending from the inner side of said first member, a second member curved outwardly at one end to form a hooked portion generally concentric with said pin in said first member when said first and second members are mated whereupon said shoulder on said first member engages the end of said hooked portion of said second member, there being a slot at the other end of said second member for co-operation with said projection on said first member, said slot also serving for the attachment of said second member to the other end of the belt, one of said members comprising a permanent magnet and the other of said members comprising a member of magnetic material which co-operates with said permanent magnet to prevent inadvertent disengagement of said first and second members by pivoting of said first member about the axis formed by the engagement of said shoulder on said first member with the end of said hooked portion of said second member.

References Cited in the file of this patent

UNITED STATES PATENTS

| | | |
|---|---|---|
| 2,045,626 | Winterhalter | June 30, 1936 |
| 2,654,929 | Feibelman | Oct. 13, 1953 |
| 2,833,015 | Kreisler | May 6, 1958 |
| 2,836,868 | Carter | June 3, 1958 |
| 2,867,023 | Putnam | Jan. 6, 1959 |
| 3,027,617 | Gray | Apr. 3, 1962 |
| 3,030,680 | Wilhelm | Apr. 24, 1962 |